(12) United States Patent
Kosaka (10) Patent No.: US 7,595,835 B2
(45) Date of Patent: Sep. 29, 2009

(54) IMAGE SENSING APPARATUS HAVING AN ALIEN SUBSTANCE REMOVING UNIT AND CONTROL METHOD THEREOF

(75) Inventor: Takashi Kosaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 11/461,845

(22) Filed: Aug. 2, 2006

(65) Prior Publication Data

US 2007/0030376 A1 Feb. 8, 2007

(30) Foreign Application Priority Data

Aug. 8, 2005 (JP) ............................. 2005-230084

(51) Int. Cl.
H04N 5/225 (2006.01)
(52) U.S. Cl. ..................................... 348/335
(58) Field of Classification Search ................ 348/335, 348/375, 340
See application file for complete search history.

(56) References Cited

U.S. PATENT DOCUMENTS

| | | | |
|---|---|---|---|
| 6,288,743 B1 * | 9/2001 | Lathrop | 348/231.9 |
| 7,057,642 B2 * | 6/2006 | Mogamiya et al. | 348/207.99 |
| 7,222,388 B2 * | 5/2007 | Sugihara | 15/310 |
| 7,274,401 B2 * | 9/2007 | Suemoto et al. | 348/335 |
| 7,280,145 B2 * | 10/2007 | Takizawa et al. | 348/340 |
| 7,349,014 B2 * | 3/2008 | Higashihara | 348/241 |
| 7,355,649 B2 * | 4/2008 | Takai | 348/372 |
| 7,365,788 B2 * | 4/2008 | Ito | 348/335 |
| 7,382,405 B2 * | 6/2008 | Kusaka et al. | 348/231.6 |
| 2005/0104997 A1 * | 5/2005 | Nonaka | 348/360 |
| 2007/0030378 A1 * | 2/2007 | Aoyama | 348/340 |

FOREIGN PATENT DOCUMENTS

| | | | |
|---|---|---|---|
| JP | 2001298640 A | * | 10/2001 |
| JP | 2002-204379 | | 7/2002 |
| JP | 2004-242158 | | 8/2004 |
| JP | 2005159711 A | * | 6/2005 |
| JP | 2005340988 A | * | 12/2005 |
| JP | 2008028545 A | * | 2/2008 |

* cited by examiner

Primary Examiner—Jason Chan
Assistant Examiner—Gary C Vieaux
(74) Attorney, Agent, or Firm—Canon USA Inc IP Division (57) ABSTRACT

In a case where a request for an operation related to photographic operation is input during an alien substance removing operation of removing an alien substance sticking to an optical element arranged in front of an image sensing element, the alien substance removing operation is interrupted, and then the processing corresponding to the request for the photographic operation is executed.

20 Claims, 5 Drawing Sheets

IMAGE SENSING APPARATUS HAVING AN ALIEN SUBSTANCE REMOVING UNIT AND CONTROL METHOD THEREOF

BACKGROUND OF THE INVENTION

1. Field of the Invention

The present invention relates to an image sensing apparatus having a function of removing an alien substance sticking to an optical element arranged in front of an image sensing element, and a control method thereof.

2. Description of the Related Art

In a lens interchangeable digital camera, when the lens is detached from the camera body, dust floating in air may enter the body. A camera incorporates various kinds of mechanical units that mechanically operate, including, e.g., a shutter mechanism. When these mechanical units operate, dust such as metal pieces may be produced in the camera body. When such an alien substance, i.e., dust sticks to the surface of the image sensing element included in the image sensing unit of the digital camera, the alien substance is seen in a taken image as a shadow, making the image quality poor. In a camera using a silver halide film, the film is fed every time an image is sensed. Hence, no alien substance is sensed continuously at the same position of images. However, a digital camera has no film movement in every photographic operation. Hence, an alien substance is sensed continuously at the same position of images.

Japanese Patent Laid-Open No. 2002-204379 proposes a technique of vibrating a cover glass (dust protecting glass) for protecting the image sensing element of a conventional lens interchangeable digital camera, thereby removing dust sticking to the glass. Such alien substance removal by vibration operation increases the release time lag and reduces the continuous shot speed. To solve this problem, Japanese Patent Laid-Open No. 2004-242158 proposes a method of executing alien substance removal only before photographing of the first frame and inhibiting alien substance removal from the second frame in the continuous shot mode.

In both cases, the alien substance removal is executed before photographing. Hence, a time lag is generated from pressing of the release button to actual execution of photographing. Alien substance removal may be done in, e.g., powering on the camera. Even in this case, the same problem occurs if the release button is operated at the time of alien substance removal, and a good shutter release opportunity may be missed.

SUMMARY OF THE INVENTION

It is an object of the present invention to solve the above-described conventional problems.

As a characteristic feature of the present invention, an image sensing apparatus capable of executing an alien substance removing operation without any influence on the release time lag is provided.

According to the present invention, there is provided with an image sensing apparatus comprising:

an alien substance removing unit configured to remove an alien substance sticking to an optical element arranged in front of an image sensing element; and a control unit configured to control, in a case where a request for an operation related to photographic operation is input during an alien substance removing operation by the alien substance removing unit, to interrupt the alien substance removing operation and execute processing corresponding to the request for the operation.

According to the present invention, there is provided with a control method of an image sensing apparatus comprising:

a removing step of removing an alien substance sticking to an optical element arranged in front of an image sensing element; and a control step of controlling, in a case where a request for an operation related to photographic operation is input during an alien substance removing operation in the removing step, to interrupt the alien substance removing operation and execute processing corresponding to the request for the operation.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The preferred embodiments of the present invention will be described below in detail with reference to the accompanying drawings. The following embodiments do not limit the claims of the present invention, and not all combinations of features described in the embodiments are essential in solving means of the present invention.

Figure 1:
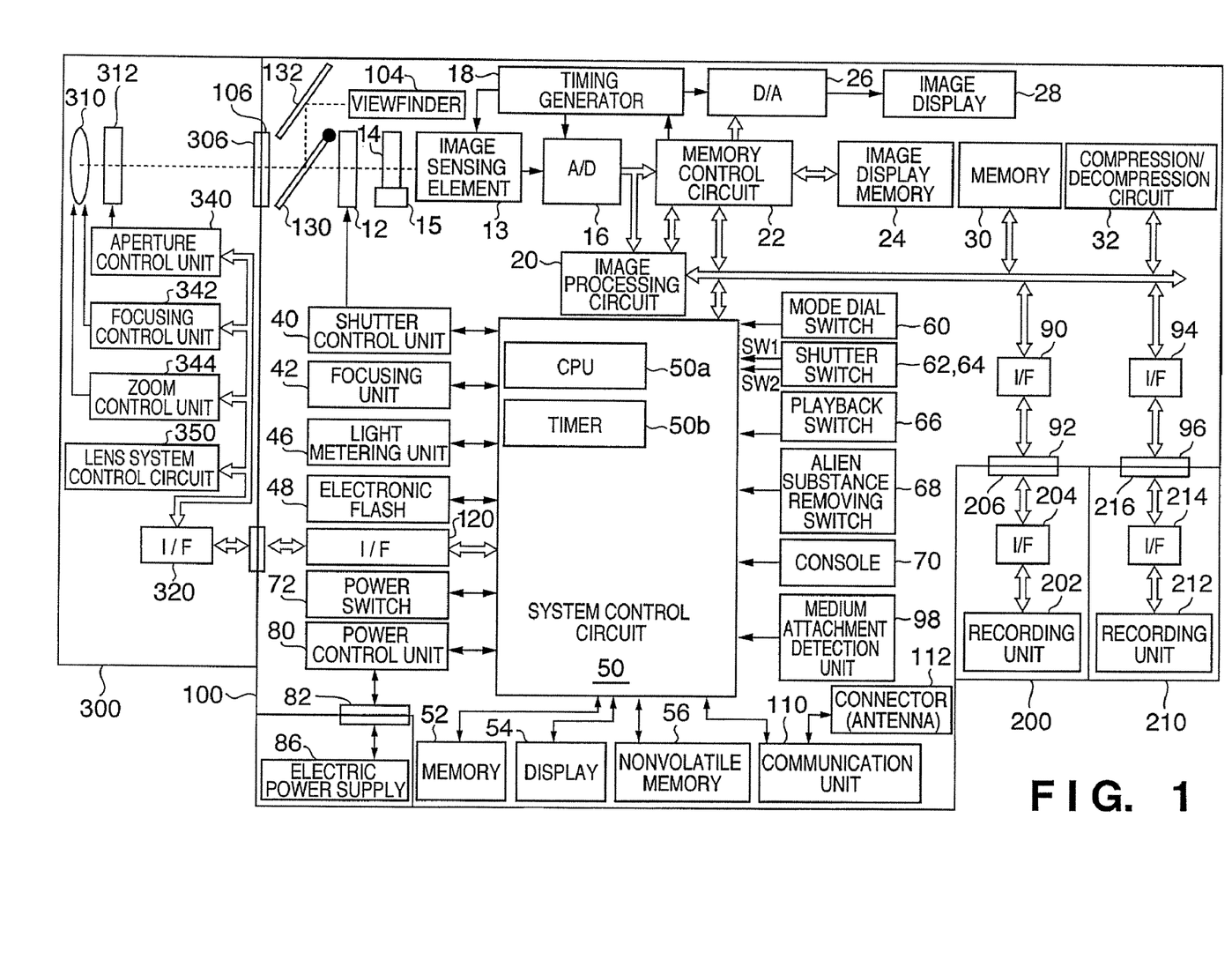
FIG. 1 is a block diagram for explaining the functional arrangement of a single-lens reflex digital camera according to the embodiment.

FIG. 1 is a block diagram for explaining the functional arrangement of a single-lens reflex digital camera (to be simply referred to as a camera hereinafter) 100 according to the embodiment of the present invention.

A shutter 12 controls the exposure amount to an image sensing element 13. The image sensing element 13 converts an optical image into an electrical signal. An optical element 14 is arranged at a predetermined position on the front side of the photoelectric conversion surface of the image sensing element 13 to prevent any alien substance from sticking to the photoelectric conversion surface. The optical element 14 includes a cover glass of the image sensing element 13 and is a dust protecting member, i.e., a dust protecting filter (to be described later in detail). A vibration member 15 is arranged adjacent to the dust protecting filter 14 and serves as a vibration means for applying a predetermined vibration to the dust protecting filter 14. The vibration member 15 is formed from, e.g., a pressure-electric conversion element (piezoelectric element).

A light beam striking a lens 310 is guided through an aperture 312, lens mounts 306 and 106, mirror 130, and shutter 12 by single-lens reflex and forms an optical image on the image sensing element 13. An A/D converter 16 converts an analog signal photoelectrically converted and output from the image sensing element 13 into a digital signal. A timing generator 18 supplies a clock signal and control signal to the image sensing element 13, the A/D converter 16, and a D/A converter 26. The timing generator 18 is controlled by a memory control circuit 22 and system control circuit 50. An image processing circuit 20 executes predetermined pixel interpolation or color conversion for data from the A/D converter 16 or memory control circuit 22. The image processing circuit 20 also executes predetermined calculation processing as needed by using obtained image data. On the basis of a thus obtained calculation result, the system control circuit 50 can perform AF (Automatic Focus) processing, AE (Automatic Exposure) processing, and EF (Electronic Flash brightness control) processing by TTL (Through The Lens) for a shutter control unit 40 and focusing unit 42. The image processing circuit 20 also executes predetermined calculation processing by using obtained image data and executes AWB (Automatic White Balance) processing by TTL on the basis of the obtained calculation result.

In this embodiment, the dedicated focusing unit 42 and a dedicated light metering unit 46 are provided. Hence, AF processing, AE processing, and EF processing may be executed by using the focusing unit 42 and light metering unit 46, and AF processing, AE processing, and EF processing using the image processing circuit 20 may be omitted. Alternatively, AF processing, AE processing, and EF processing may be executed by using the focusing unit 42 and light metering unit 46 and also by using the image processing circuit 20.

The memory control circuit 22 controls the A/D converter 16, the timing generator 18, the image processing circuit 20, the image display memory 24, the D/A converter 26, a memory 30, and a compression/decompression circuit 32. Digital data output from the A/D converter 16 is written in the image display memory 24 or memory 30 through the image processing circuit 20 and memory control circuit 22 or directly through the memory control circuit 22. An image display 28 comprises a TFT or LCD. Display image data written in the image display memory 24 is displayed on the image display 28 through the D/A converter 26. The memory 30 is used to store obtained still image data and has a memory capacity enough to store still image data corresponding to a predetermined number of frames. Hence, even in the continuous shot mode to continuously take a plurality of frames of still images, an enormous amount of images can be written in the memory 30 at a high speed. The memory 30 can also be used as the work area of the system control circuit 50. The compression/decompression circuit 32 compresses/decompresses image data by adaptive discrete cosine transform (ADCT). The compression/decompression circuit 32 reads out an image stored in the memory 30, compresses or decompresses the image data, and writes the processed data in the memory 30.

The shutter control unit 40 controls the operation of the shutter 12 on the basis of light metering information from the light metering unit 46 in cooperation with an aperture control unit 34 that controls the aperture 312. The focusing unit 42 executes AF (Automatic Focus) processing. Upon receiving a light beam incident from the lens 310, the focusing unit 42 measures the in-focus state of an image formed as an optical image. The light metering unit 46 executes AE processing and measure the exposure state of an image formed as an optical image upon receiving a light beam incident from the lens 310. The light metering unit 46 also has an EF processing function in cooperation with an electronic flash 48. The electronic flash 48 also has an AF auxiliary light projecting function and an electronic flash brightness control function. AF control may be done by using both the measurement result by the focusing unit 42 and the calculation result obtained by causing the image processing circuit 20 to calculate image data sensed by the image sensing element 13. Exposure control may be done by using both the measurement result by the light metering unit 46 and the calculation result obtained by causing the image processing circuit 20 to calculate image data sensed by the image sensing element 13.

The system control circuit 50 comprises a CPU 50$a$ such as a microcomputer and a timer 50$b$ to count time in accordance with an instruction from the CPU 50$a$. The system control circuit 50 controls the overall operation of the camera 100. A memory 52 stores constants and variables for the operation of the system control circuit 50 and programs to be executed by the CPU 50$a$. A display 54 includes a liquid crystal display device and loudspeaker to indicate an operation state and message by using a text, image, and sound in accordance with program execution by the system control circuit 50. These units are arranged at a single or a plurality of visible positions near the console of the camera 100 by combining, e.g., LCDs, LEDs, and sound generation elements. Some functions of the display 54 are arranged in a viewfinder 104. Examples of display contents on the LCD of the display 54 are the single shot/continuous shot mode, self timer, compression ratio, number of recording pixels, number of recorded images, number of recordable images, shutter speed, F-number, exposure compensation, flash, pink-eye effect relieving, buzzer setting, battery level, error, information by a plurality of digits, attached state of recording medium 200 and 210, attached state of a lens unit 300, communication I/F operation, date/time, and connection state with an external computer. Of the display contents of the display 54, examples of display in the viewfinder 104 are in-focus, ready-to-photographing, camera shake warning, flash charge, flash charge completion, shutter speed, F-number, exposure compensation, and recording medium write operation. In addition, an example of display contents on the LEDs of the display 54 is a recording medium write operation. An example of lamp indication of the display 54 is a self-timer notification lamp. The self-timer notification lamp may be used together with AF auxiliary light. A non-volatile memory 56 is an electrically erasable/recordable memory such as an EEPROM. Reference numerals 60, 62, 64, 66, 68, and 70 denote switches and dials to be used to input various kinds of operation instructions of the system control circuit 50.

The mode dials and switches will be described next in detail.

The mode dial switch 60 can selectively set functional photography modes such as an automatic photography mode, programmed photography mode, shutter speed-priority photography mode, aperture-priority photography mode, manual photography mode, depth of focus-priority photography mode, portrait photography mode, landscape photography mode, close-up photography mode, sports photography mode, night view photography mode, and panoramic photography mode. The shutter switch (SW1) 62 is turned halfway through the operation of a shutter release button to instruct the start of an operation such as AF processing, AE processing, AWB processing, or EF processing. The shutter switch (SW2) 64 is turned on at the end of operation of the shutter release button to write image data read from the image sensing element 13 in the memory 30 through the A/D converter 16 and memory control circuit 22. That is, the shutter switch (SW2) 64 instructs the start of a series of processing operations including exposure processing, development processing using calculation by the image processing circuit 20 and memory control circuit 22, image data read from the memory 30, image data compression by the compression/decompression circuit 32, and image data write in the recording medium 200 or 210. The playback switch 66 instructs the start of playback operation to read out a sensed image from the memory 30 or recording medium 200 or 210 and display it on the image display 28 in a photography mode. The alien substance removing switch 68 instructs the start of alien substance detection operation.

The console 70 has various kinds of buttons and a touch panel. They includes a menu button, set button, multiwindow playback page break button, flash setting button, single shot/continuous shot/self-timer switching button, menu move + (plus) button, menu move − (minus) button, playback image move + (plus) button, playback image move − (minus) button, image quality select button, exposure compensation button, and date/time setting button. There are also an image display ON/OFF switch to set ON/OFF of the image display 28, a quick review ON/OFF switch to set a quick review function of automatically playing back sensed image data immediately after photographing, a compression mode switch to select the compression ratio of JPEG compression or a CCDRAW mode to directly digitize the signal from the image sensing element 13 and record it on the recording medium 200 or 210, a playback switch capable of setting various function modes such as a playback mode, multiwindow playback/erase mode, and PC connection mode, and an AF mode setting switch capable of setting a one-shot AF mode in which the autofocus operation starts when the shutter switch (SW1) 62 is pressed, and once an in-focus state is obtained, it is continuously maintained, and a servo AF mode in which the autofocus operation is continuously executed while the shutter switch (SW1) 62 is kept pressed. When a rotary dial switch is provided, the plus and minus buttons can more easily be operated to select a numeral value or function.

A power switch 72 can selectively set the power ON/OFF mode of the camera 100. The power switch 72 can also selectively set power ON/OFF of various attachment devices such as the lens unit 300, external flash unit, and recording medium 200 and 210 connected to the camera 100. A power control unit 80 includes a battery detection circuit, DC/DC converter, and switch circuit to switch a block to be energized. The power control unit 80 detects the presence/absence of a battery, battery type, and battery level, controls the DC/DC converter on the basis of the detection result and an instruction from the system control circuit 50, and supplies a necessary voltage to the units including the recording medium for a necessary period. Reference numeral 82 denotes a connector; and numeral 86 denotes an electric power supply formed from a primary cell (battery) such as an alkaline cell or lithium cell, a secondary cell such as an NiCd cell or Li cell, or an AC adapter.

Reference numerals 90 and 94 denote interfaces to a recording medium such as a memory card or hard disk; and numerals 92 and 96 denote connectors to connect a recording medium such as a memory card or hard disk. A medium attachment detection unit 98 detects whether the corresponding recording medium 200 and 210 are attached to the connectors 92 and 96, respectively.

In this embodiment, there are two systems of interfaces and connectors to attach recording medium. The interfaces and connectors to attach recording medium can have either one or a plurality of systems. Interfaces and connectors of different standards may be combined. Interfaces and connectors based on a standard such as a PCMCIA card or CF (Compact Flash) card can be used. When the interfaces 90 and 94 and connectors 92 and 96 based on a standard such as a PCMCIA card or CF (Compact Flash) card are used, various kinds of communication cards such as a LAN card, modem card, USB card, IEEE1394 card, SCSI card, and communication card for PHS can be connected. Hence, image data and management information associated with image data can be transferred to/from another computer or a peripheral device such as a printer.

The viewfinder 104 guides a light beam striking the lens 310 through the aperture 312, lens mounts 306 and 106, and mirrors 130 and 132 and forms an optical image. Photographing can be done by using only the viewfinder 104 without using the electronic finder function of the image display 28. The viewfinder 104 incorporates some functions of the display 54 to display, e.g., in-focus, camera shake warning, electronic flash charge, shutter speed, F-number, and exposure compensation.

A communication unit 110 has various kinds of communication functions such as RS232, USB, IEEE1394, SCSI, modem, LAN, and wireless communication. With these communication functions, image data and management information associated with image data can be transferred to/from another computer or a peripheral device such as a printer. Transfer of image data will be described later in detail. Reference numeral 112 denotes a connector to connect the camera 100 to another device through the communication unit 110 or an antenna for wireless communication.

An interface 120 connects the camera 100 to the lens unit 300 in the lens mount 106. A connector 122 electrically connects the camera 100 to the lens unit 300. A lens detachment detection unit (not shown) detects whether the lens unit 300 is attached to the lens mount 106 or connector 122. The connector 122 also has a function of transmitting a control signal, status signal, and data signal between the camera 100 and the lens unit 300 and also a function of supplying currents of various voltages. The connector 122 may transmit optical communication and speech communication in addition to electrical communication.

The recording medium 200 includes a memory card or hard disk. The recording medium 200 comprises a recording unit 202 formed from, e.g., a semiconductor memory or magnetic disk, an interface 204 to the camera 100, and a connector 206 to be connected to the camera 100. The recording medium 210 includes a memory card or hard disk. The recording medium 210 comprises a recording unit 212 formed from, e.g., a semiconductor memory or magnetic disk, an interface 214 to the camera 100, and a connector 216 to be connected to the camera 100.

In the interchangeable lens unit 300, an interface 320 connects the lens unit 300 to the camera 100. A connector 322 electrically connects the lens unit 300 to the camera 100. The connector 322 also has a function of transmitting a control signal, status signal, and data signal between the camera 100 and the lens unit 300 and also a function of receiving or supplying currents of various voltages. The connector 322 may transmit optical communication and speech communication in addition to electrical communication. An aperture control unit 340 controls the aperture 312 in cooperation with the shutter control unit 40 that controls the shutter 12 on the basis of light metering information from the light metering unit 46. A focusing control unit 342 controls focusing of the photographing lens 310. A zoom control unit 344 controls zooming of the photographing lens 310.

A lens system control circuit 350 controls the entire lens unit 300. The lens system control circuit 350 also comprises a memory to store constants, variables, and programs for operations, and a nonvolatile memory to hold identification information such as a number unique to the lens unit 300, management information, function information such as a full-aperture value, stopped-down-aperture value, and focal length, and present and past set values.

During the alien substance removing operation, the dust protecting filter 14 is vibrated by the vibration member 15 so that dust on the surface of the dust protecting filter 14 is removed. In this method, as an example of the alien substance removing method, the dust protecting filter 14 is vibrated. However, the period of the voltage to be applied to the vibration member (piezoelectric element) 15 and the vibration direction of the dust protecting filter 14 are not particularly limited. The generated vibration can be either a primary harmonic or higher order harmonic. The alien substance removing method of the present invention is not limited to this embodiment, and any other method can also be used. The alien substance removing method need not always physically remove alien substances. Instead, the positional information of an alien substance on the image sensing element 13 may be stored, and the image data of the alien substance may be removed from sensed image data based on the positional information.

Figure 2:
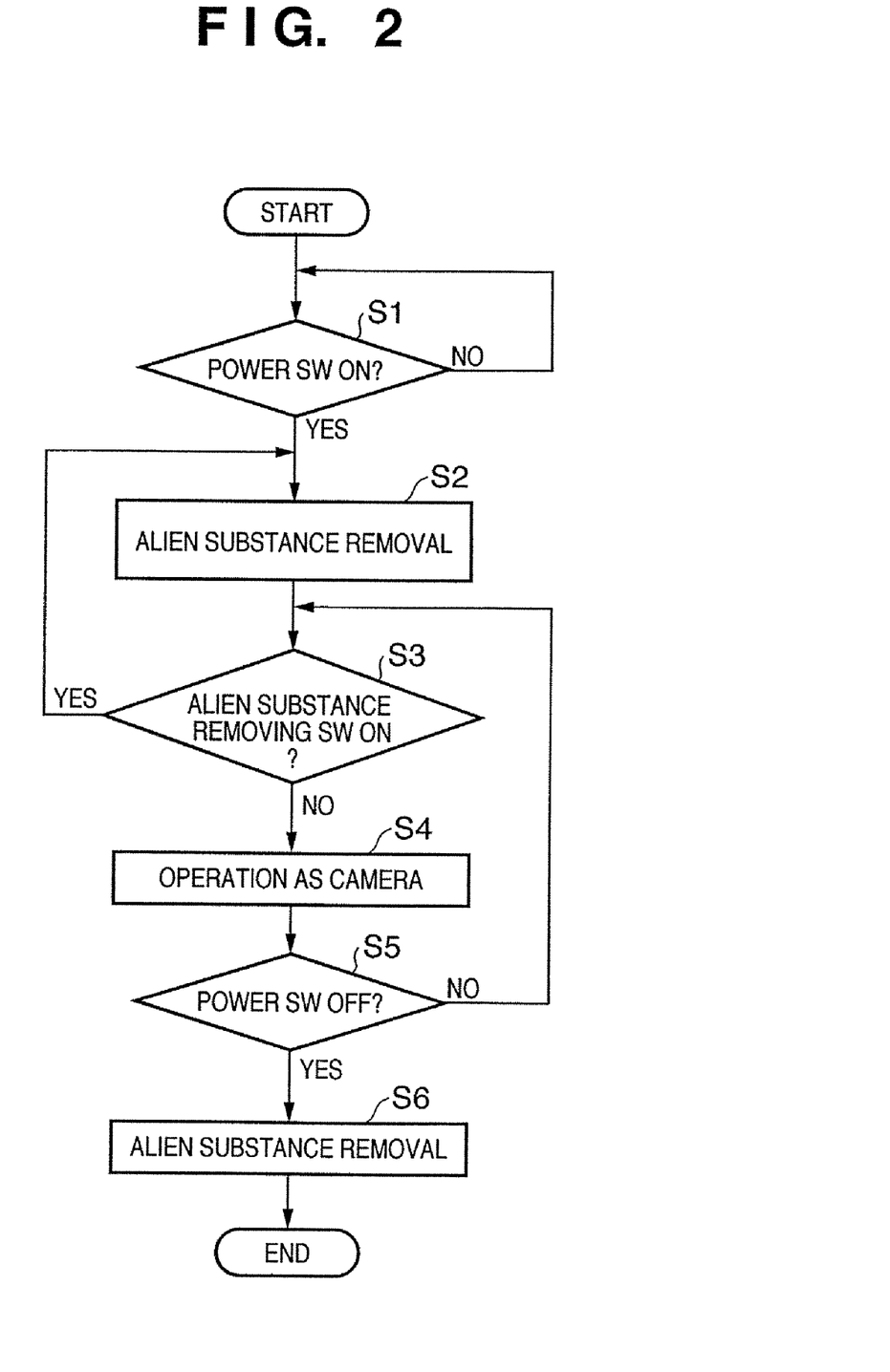
FIG. 2 is a flowchart for explaining start processing of an alien substance removing operation in the camera according to the embodiment.

FIG. 2 is a flowchart for explaining processing of the alien substance removing operation in the camera 100 according to this embodiment. This processing is executed by the system control circuit 50.

In step S1, the camera 100 is powered on. The process advances to step S2 to activate the above-described alien substance removing operation. If the alien substance removing switch 68 that the photographer operates to do alien substance removal at an arbitrary timing is turned on in step S3, the process returns to step S2 to repeatedly execute the alien substance removing operation. If the alien substance removing switch 68 is turned off in step S3, the process advances to step S4 to execute the normal operation of the camera.

In step S5, it is determined whether the power switch is turned off. If the power switch is not turned off, the process returns to step S3 to execute the above-described processing. If the power switch is turned off in step S5, the process advances to step S6 to execute the alien substance removing operation.

As described above, upon powering on (step S1) and off (step S4) the camera and when the alien substance removing switch 68 that the photographer wants alien substance removal at an arbitrary timing is pressed (step S3), the alien substance removing operation is started (steps S2 and S6).

Since the alien substance removing operation is executed at a predetermined timing (e.g., at the time of power ON/OFF) without the alien substance removal instruction from the photographer, the image sensing element 13 can always be kept free from alien substances. The flowchart shown in FIG. 2 merely explains an example of alien substance removal timing and does not limit the present invention. Except that, the alien substance removing operation may be executed at, e.g., the lens exchange timing.

First Embodiment

An operation executed when a request for a certain operation is input by the photographer during the alien substance removing operation will be described next.

Figure 3:
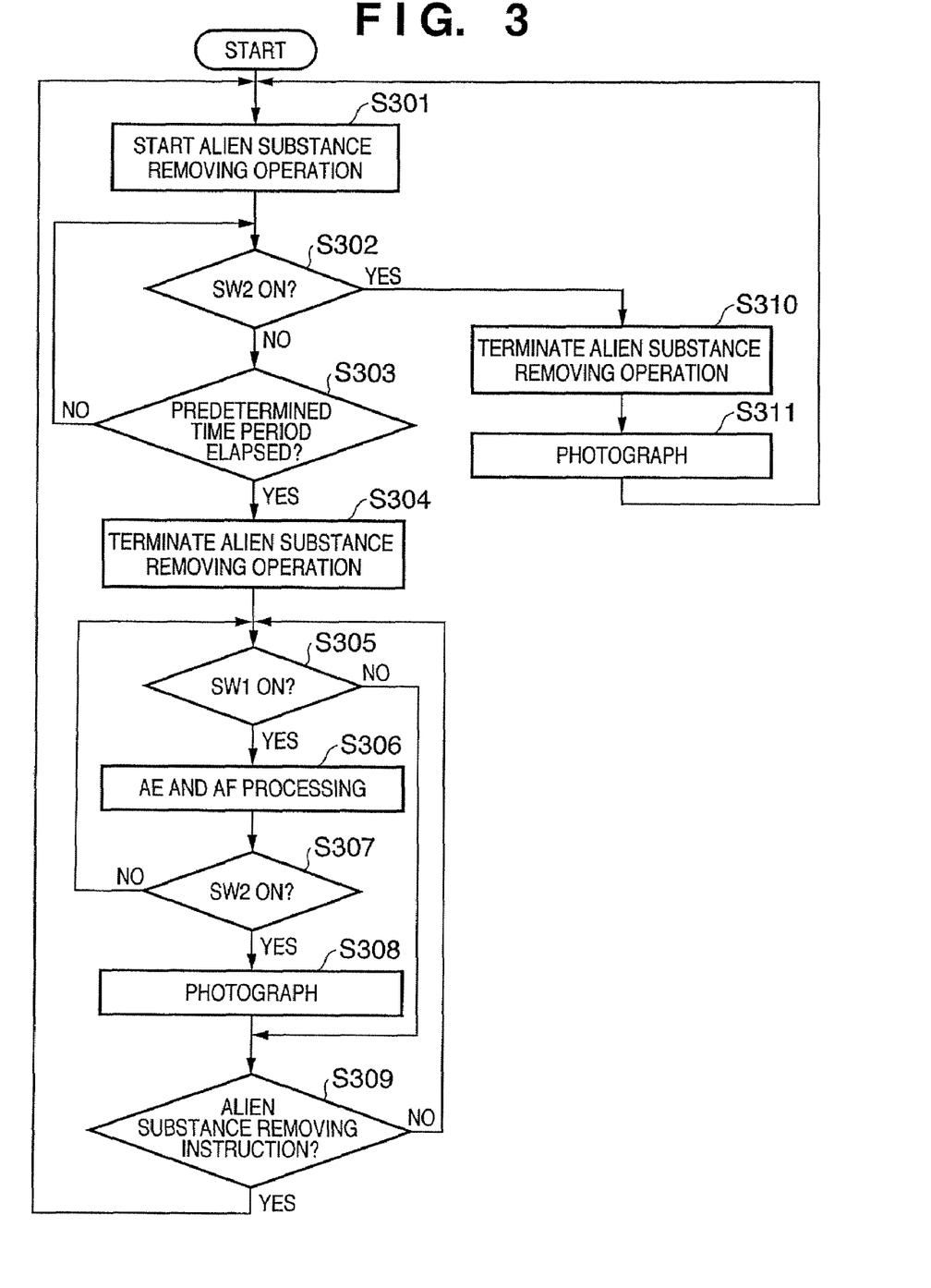
FIG. 3 is a flowchart for explaining processing in a case that a photographic operation is requested during an alien substance removing operation in a camera according to the first embodiment.

FIG. 3 is a flowchart for explaining processing in a case that a photographic operation is requested during the alien substance removal operation in a camera 100 according to the first embodiment. The program to execute this processing is stored in a memory 52 and executed under the control of a CPU 50a.

In step S301, the alien substance removing operation is started. The alien substance removing operation is activated upon power ON or turning on an alien substance removing switch 68, as shown in, e.g., the flowchart of FIG. 2 described above. In step S302, it is determined whether a switch (SW2) 64 to instruct photographing by the shutter release button is turned on. If it is determined that the switch (SW2) 64 is not turned on, the process advances to step S303 to determine on the basis of time count by a timer 50b whether a predetermined time has elapsed. If it is determined that the predetermined time has not elapsed yet, the process returns to step S302 to determine again whether the switch (SW2) 64 is turned on. If it is determined in step S303 that the predetermined time has elapsed, the process advances to step S304 to terminate the alien substance removing operation. Then, the process advances to step S305. From step S305, processing in the normal photographing standby mode is executed. In step S305, it is determined whether a shutter switch (SW1) 62 is turned on. If the shutter switch (SW1) 62 is not turned on, the process advances to step S309. If the shutter switch (SW1) 62 is turned on, the process advances to step S306 to execute AE and AF processing, as in the normal photographing mode. Then, the process advances to step S307. In step S307, it is determined whether the shutter switch (SW2) 64 is turned on. If it is determined that the shutter switch (SW2) 64 is not turned on, the process returns to step S305. If it is determined that the shutter switch (SW2) 64 is turned on, the process advances to step S308 to start photographing. In step S309, it is determined whether the alien substance removing switch 68 is turned on. In a case that it is determined in the step S309 that the switch 68 is turned on, the process returns to step S301 to start the alien substance removing operation. On the other hand, if it is determined that the alien substance removing switch 68 is not turned on in the step S309, the process returns to step S305 to repeat the above-described processing.

On the other hand, if it is determined that the shutter switch (SW2) 64 is pressed during the alien substance removing operation in step S302, the process advances to step S310 to stop the alien substance removing operation. In step S311, the photographic operation is started as well as in the step S308. When the series of photographing operations is ended, the process returns to step S301 to resume the interrupted alien substance removing operation.

In this embodiment, the interrupted alien substance removing operation is resumed when photographing is ended. However, the present invention is not limited to this. For example, a state in which the alien substance has been removed may be determined in a case where the alien substance removing operation is interrupted, and according to the degree, it may be determined whether or not to resume the alien substance removing operation after the photographing.

The state may be determined on the basis of the elapse time of the alien substance removing operation or a detection result of an alien substance by some alien substance detection means.

The alien substance removing operation is sometimes divided into, e.g., a first step of obtaining an optimum oscillation frequency of the vibration member 15 and a second step of starting vibrating the vibration member 15 at the decided frequency. In this case, if the first step has been ended at the time of interruption of the alien substance removing operation, the operation may be resumed from the second step.

In FIG. 3, the alien substance removing operation is interrupted by the photographic operation using the shutter switch (SW2) 64. However, the alien substance removing operation may be interrupted by the ON operation of the shutter switch (SW1) 62. In this case, AF and AE processing is executed as in normal photographing. When the shutter switch (SW2) 64 is turned on then, the photographic operation is executed.

The alien substance removing operation may be interrupted by the electric charging operation of the electronic flash 48 or, if the electronic flash 48 can retract/pop up, at the timing of the pop-up operation of the electronic flash 48, namely in the case that the load of the power supply is large. That is, the operation or function that interrupts the alien substance removing operation is not particularly limited.

As described above, according to the first embodiment, when the shutter release button is pressed during the alien substance removing operation, the photographic operation can immediately be started by interrupting the alien substance removing operation. Hence, the photographer never misses the shutter release opportunity even during the alien substance removing operation so that a desired photographic operation can be executed.

Second Embodiment

The second embodiment of the present invention will be described next.

As the characteristic feature of the second embodiment, the photographer can set in advance whether or not to interrupt the alien substance removing operation upon receiving a request for a predetermined operation such as a photographic operation during the alien substance removing operation. The arrangement of a camera 100 according to the second embodiment is the same as in the above-described first embodiment, and a description thereof will be omitted.

Figure 4:
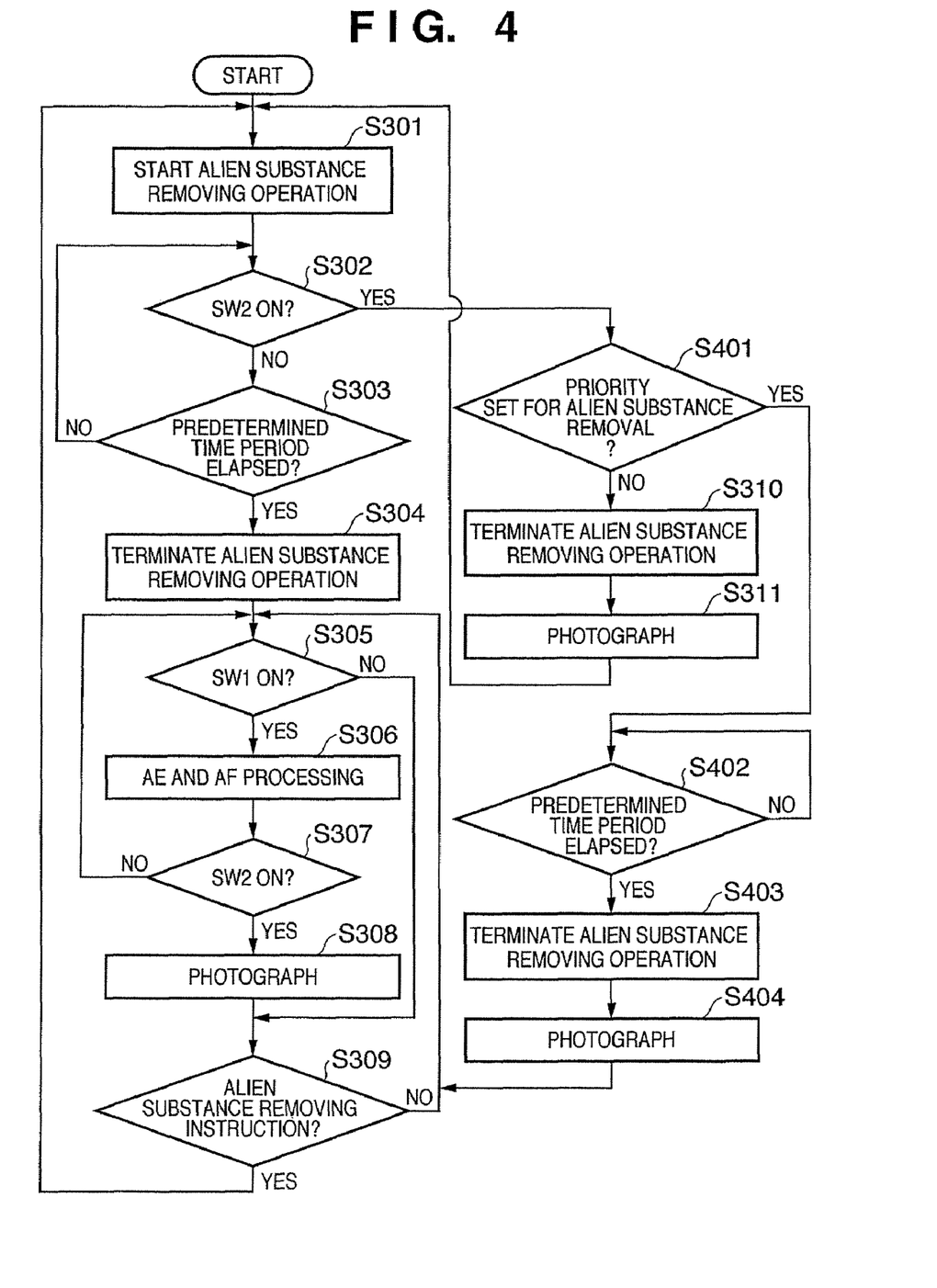
FIG. 4 is a flowchart for explaining processing in a case that a photographic operation is requested during an alien substance removing operation in a camera according to the second embodiment.

FIG. 4 is a flowchart for explaining processing in a case that a photographic operation is requested during the alien substance removing operation in the camera 100 according to the second embodiment. The program to execute this processing is stored in a memory 52 and executed under the control of a CPU 50a. The same step numbers as in FIG. 3 described above denote the same processing steps in FIG. 4, and a description thereof will be omitted.

The alien substance removing operation started in step S301 continues until it is determined in step S303 that a predetermined time has elapsed. When a shutter switch (SW2) 64 is pressed during the alien substance removing operation, the process advances to step S401. In step S401, it is determined whether the priority is set for the alien substance removing operation or photographic processing. If the photographic operation has higher priority, the process advances to step S310 to interrupt the alien substance removing operation, as described in FIG. 3. Then, the process advances to step S311 to execute photographing, and then returns to step S301.

On the other hand, if it is determined that the higher priority is set for the alien substance removing operation in step S401, the process advances to step S402 to wait for a predetermined time period until the processing time necessary for the alien substance removal operation has elapsed. After the processing time elapses, the process advances to step S403 to terminate the alien substance removing operation. In step S404, the photographic processing is executed, as in step S311, and the process advances to step S305.

In the flowchart of FIG. 4, it is determined whether or not to interrupt the alien substance removing operation when the shutter switch (SW2) 64 is depressed. Whether or not to terminate the alien substance removing operation or to set priority for the alien substance removing operation may be determined even in the AF or the light metering operation based on the depression of the shutter switch (SW1) 62. In the second embodiment, the operation or function that interrupts the alien substance removing operation is not particularly limited.

The priority setting can be done by using, e.g., the UI window of the camera 100. Alternatively, a dedicated switch may be provided so that determination can be done in accordance with setting of the switch.

As described above, according to the second embodiment, the photographer can designate whether to immediately execute photographing by interrupt the alien substance removing operation or continue the alien substance removing operation when the shutter release button is pressed during the alien substance removing operation.

Third Embodiment

The third embodiment of the present invention will be described next.

As the characteristic feature of the third embodiment, the camera automatically determines whether or not to interrupt the alien substance removing operation, upon receiving a request for a predetermined operation such as a photographic operation during the alien substance removing operation.

Figure 5:
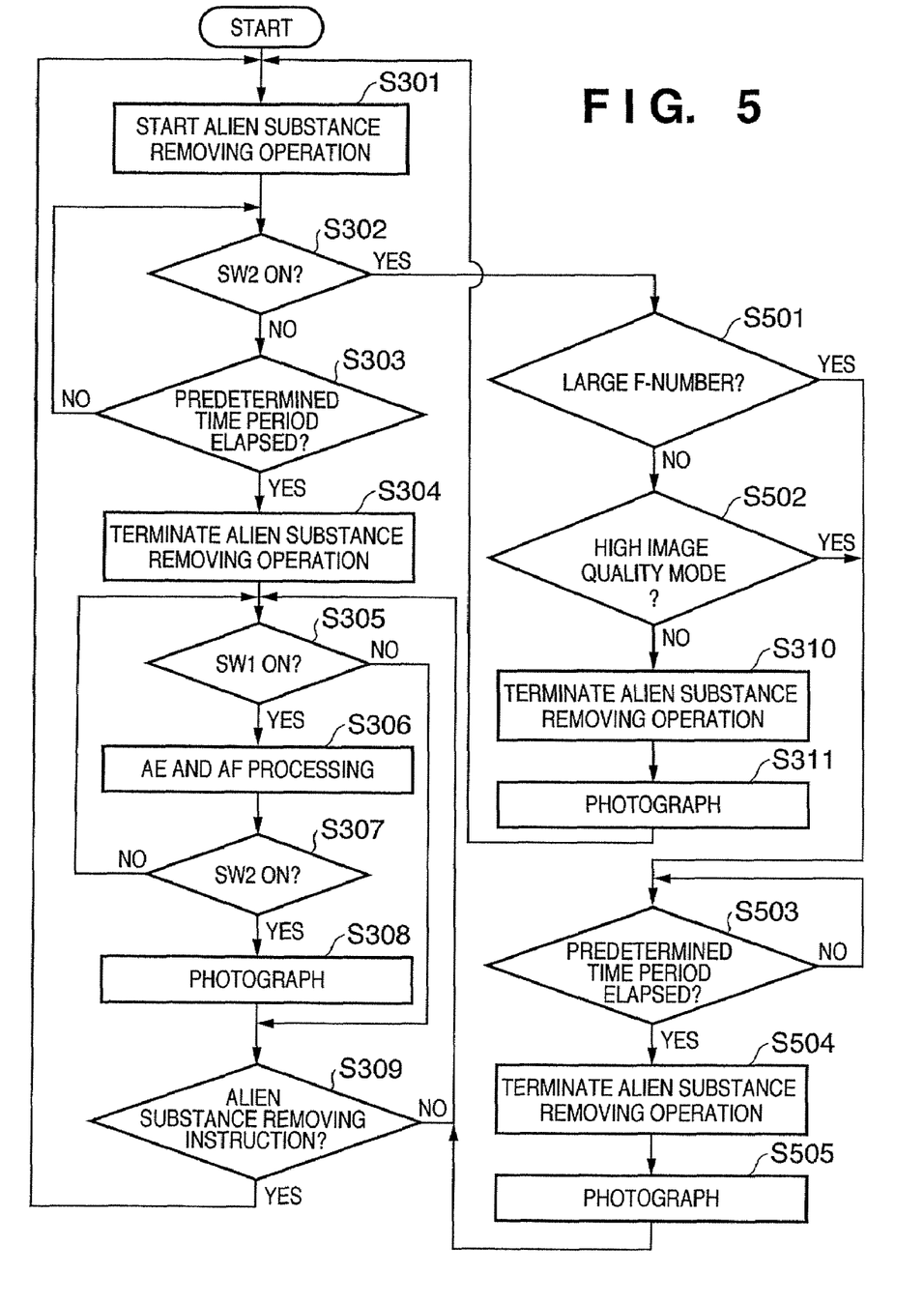
FIG. 5 is a flowchart for explaining processing a predetermined operation request is received during an alien substance removing operation in a camera according to the third embodiment.

FIG. 5 is a flowchart for explaining processing when a request for a predetermined operation is received during the alien substance removing operation in a camera 100 according to the third embodiment. The program to execute this processing is stored in a memory 52 and executed under the control of a CPU 50a. The same step numbers as in FIG. 3 described above denote the same processing steps in FIG. 5, and a description thereof will be omitted.

The alien substance removing operation started in step S301 continues until it is determined in step S303 that a predetermined time period has elapsed. When a shutter switch (SW2) 64 is pressed during the alien substance removing operation, the process advances to step S501. In step S501, it is determined whether the set F-number or calculated F-number is larger than a predetermined F-number. If YES in step S501, the process advances to step S503 to wait until a predetermined time period necessary for the alien substance removal operation has elapsed. When the processing time period has elapsed, the process advances to step S504 to terminate the alien substance removing operation. The process then advances to step S505 to execute photographic processing. The predetermined F-number is a value at which the influence of sticking dust (alien substance) starts being noticeable in a sensed image.

If no predetermined F-number is set in step S501, the process advances to step S502 to determine whether a high image quality mode for photographing is set. If the high image quality mode is set, the process advances to step S503 to wait until the predetermined time period necessary for the alien substance removal operation has elapsed. If no high image quality mode is set in step S502, the process advances to step S310 to interrupt the alien substance removing operation. Then in step S311, the photographic operation is started. When the series of photographing operations are ended, the process returns to step S301 to resume the interrupted alien substance removing operation.

As described above, according to the third embodiment, if the influence of an alien substance on a sensed image is large, i.e., the high image quality mode is set, or the F-number is small, it is determined that the alien substance removal operation has higher priority than the photographing. In this case, the process waits until the predetermined time period necessary for the alien substance removal operation has elapsed. When the predetermined time period has elapsed, the alien substance removing operation is ended. Then, the photographic sequence can be started. Hence, the influence of an alien substance on a sensed image can be eliminated. In addition, in a case that it is determined that the influence of an alien substance may be small, the photographing by the shutter release button has higher priority. Hence, the probability to miss the shutter release opportunity can be lowered.

In FIG. 5, the alien substance removing operation is interrupted by the photographic operation depressing the shutter switch (SW2) 64. However, the alien substance removing operation may be interrupted by the AF or the light metering operation by depressing the shutter switch (SW1) 62. The operation or function that interrupts the alien substance removing operation is not limited to the arrangement of this embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2005-230084 filed Aug. 8, 2005, which is hereby incorporated by reference herein in its entirety.

What is claimed is:

1. An image sensing apparatus comprising:
an alien substance removing unit adapted to remove an alien substance sticking to an optical element arranged in front of an image sensing element;
an output unit adapted to output an automatic focusing request; and
a control unit adapted to control, in a case where the automatic focusing request is input during an alien substance removing operation by the alien substance removing unit, to interrupt the alien substance removing operation and execute processing corresponding to the automatic focusing request.

2. The apparatus according claim 1, further comprising a resumption unit configured to resume the interrupted alien substance removing operation after the processing based on the request for the operation is terminated.

3. An image sensing apparatus comprising:
an alien substance removing unit adapted to remove an alien substance sticking to an optical element arranged in front of an image sensing element;
an output unit adapted to output a light metering request; and
a control unit adapted to control, in a case where the light metering request is input during an alien substance removing operation by the alien substance removing unit, to interrupt the alien substance removing operation and execute processing corresponding to the light metering request.

4. An image sensing apparatus comprising:
an alien substance removing unit adapted to remove an alien substance sticking to an optical element arranged in front of an image sensing element;
an output unit adapted to output a request for an operation in which a load of a power supply of the image sensing apparatus is large; and
a control unit adapted to control, in a case where the request for the operation is input during an alien substance removing operation by the alien substance removing unit, to interrupt the alien substance removing operation and execute processing corresponding to the request for the operation.

5. The apparatus according claim 4, wherein the request for the operation is an electronic flash pop-up operation.

6. The apparatus according claim 4, wherein the request for the operation is an electronic flash charging operation.

7. An image sensing apparatus comprising:
an alien substance removing unit adapted to remove an alien substance sticking to an optical element arranged in front of an image sensing element;
a setting unit adapted to set a priority of a request for an operation related to photographic operation and an alien substance removing operation by the alien substance removing unit; and
a control unit adapted to, in a case where the request for the operation related to photographic operation is input during the alien substance removing operation, execute processing corresponding to the priority set by the setting unit.

8. An image sensing apparatus comprising:
an alien substance removing unit adapted to remove an alien substance sticking to an optical element arranged in front of an image sensing element;
a determination unit adapted to determine which of an alien substance removing operation by the alien substance removing unit or an operation corresponding to a request for operation related to a photographic operation is performed, based on the photographic conditions in the photographic operation, in a case where the request for operation related to the photographic operation is input during the alien substance removing operation; and
a control unit adapted to execute processing on the basis of a determination result by the determination unit.

9. The apparatus according claim 8, wherein the photographic conditions include one of an F-number and an image quality.

10. The apparatus according claim 8, further comprising a switch to activate the alien substance removing operation by the alien substance removing unit.

11. A control method of an image sensing apparatus comprising:
a removing step of removing an alien substance sticking to an optical element arranged in front of an image sensing element;
an output step of outputting an automatic focusing request; and
a control step of controlling, in a case where the automatic focusing request is input during an alien substance removing operation in the removing step, to interrupt the alien substance removing operation and execute processing corresponding to the automatic focusing request.

12. The method according claim 11, further comprising a resumption step of resuming the interrupted alien substance removing operation after processing based on the request for the operation is terminated.

13. The method according to claim 11, wherein the removing step is activated by depressing a switch of the image sensing apparatus.

14. A control method of an image sensing apparatus comprising:
a removing step of removing an alien substance sticking to an optical element arranged in front of an image sensing element;
an output step of outputting a light metering request; and
a control step of controlling, in a case where the light metering request is input during an alien substance removing operation in the removing step, to interrupt the alien substance removing operation and execute processing corresponding to the automatic focusing request.

15. A control method of an image sensing apparatus comprising:
a removing step of removing an alien substance sticking to an optical element arranged in front of an image sensing element;
an output step of outputting a request for an operation in which a load of a power supply is large; and
a control step of controlling, in a case where the request for the operation is input during an alien substance removing operation in the removing step, to interrupt the alien substance removing operation and execute processing corresponding to the request for the operation.

16. The method according claim 15, wherein the request for the operation in which a load of a power supply is large is an electronic flash pop-up operation.

17. The method according claim 15, wherein the request for the operation in which a load of a power supply is large is an electronic flash charging operation.

18. A control method of an image sensing apparatus comprising:
- a removing step of removing an alien substance sticking to an optical element arranged in front of an image sensing element;
- a setting step of setting a priority of a request for an operation related to photographic operation and an alien substance removing operation in the removing step; and
- an execution step of executing processing corresponding to the set priority, in a case where the request for the operation related to photographic operation is input during the alien substance removing operation.

19. A control method of an image sensing apparatus comprising:
- a removing step of removing an alien substance sticking to an optical element arranged in front of an image sensing element;
- a determination step of determining which of an alien substance removing operation or an operation corresponding to a request for operation related to a photographic operation is performed, based on the set photographic conditions, in a case where the request for operation related to the photographic operation is input during the alien substance removing operation; and
an execution step of executing processing on the basis of a determination result in the determination step.

20. The method according claim 19, wherein the photographic conditions include one of an F-number and an image quality.

* * * * *